United States Patent

[11] 3,553,417

| [72] | Inventors | Norman F. Smith |
| | | Methuen; |
| | | Edward T. Stocker, Georgetown, Mass. |
| [21] | Appl. No. | 724,329 |
| [22] | Filed | Apr. 26, 1968 |
| [45] | Patented | Jan. 5, 1971 |
| [73] | Assignee | Western Electric Company, Incorporated |
| | | New York, N.Y. |
| | | a corporation of New York |

[54] WIRE BONDING AND SERVERING APPARATUS
7 Claims, 5 Drawing Figs.

[52] U.S. Cl. .................................................. 219/78,
219/56, 219/68, 219/112
[51] Int. Cl. .................................................. B23k 11/22
[50] Field of Search .......................................... 219/68,
107, 78, 79, 56

[56] References Cited
UNITED STATES PATENTS
2,316,597  4/1943  Kershaw ...................... 219/107X
2,460,807  2/1949  Chanowitz ................... 219/80X
2,955,192  10/1960 Cohen ......................... 219/68X
3,303,315  2/1967  Smith et al. .................. 140/112X

*Primary Examiner*—J. V. Truhe
*Assistant Examiner*—Hugh D. Jaeger
*Attorneys*—H. J. Winegar, R. P. Miller and A. J. Nugent ABSTRACT: Apparatus for welding a wire to spaced points on successively advanced articles includes an upper welding electrode and a grounded lower welding electrode. Two sparking electrodes are disposed adjacent the upper welding electrode. As the wire is bonded to a first point on an article, an electric arc jumps a gap between one sparking electrode and the grounded wire to sever off a leading end of the wire adjacent the first point. Subsequently, the other sparking electrode similarly severs the wire at a trailing end as it is welded to a second point on the article.

INVENTORS
N. F. SMITH
E. T. STOCKER

By  A. S. Rosen
ATTORNEY

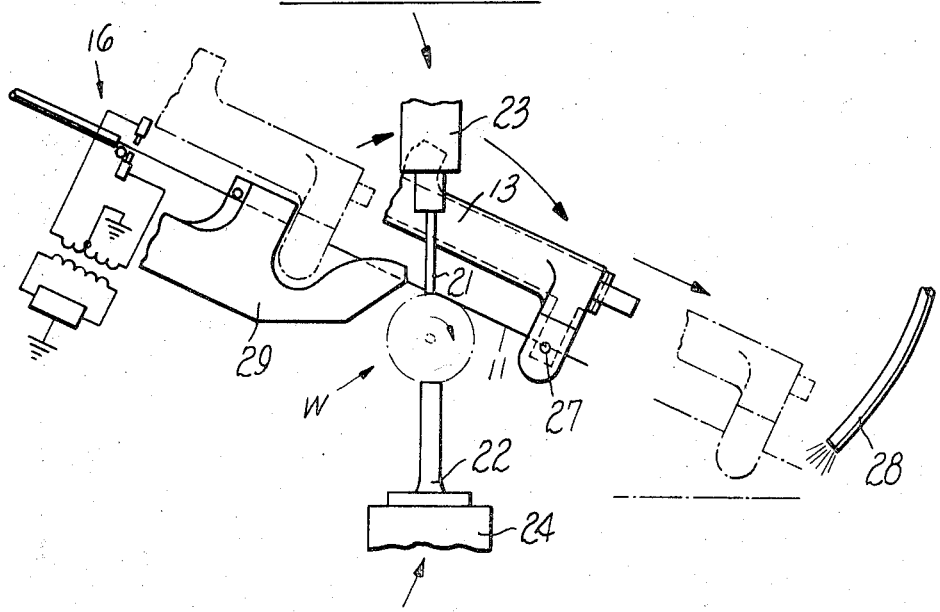
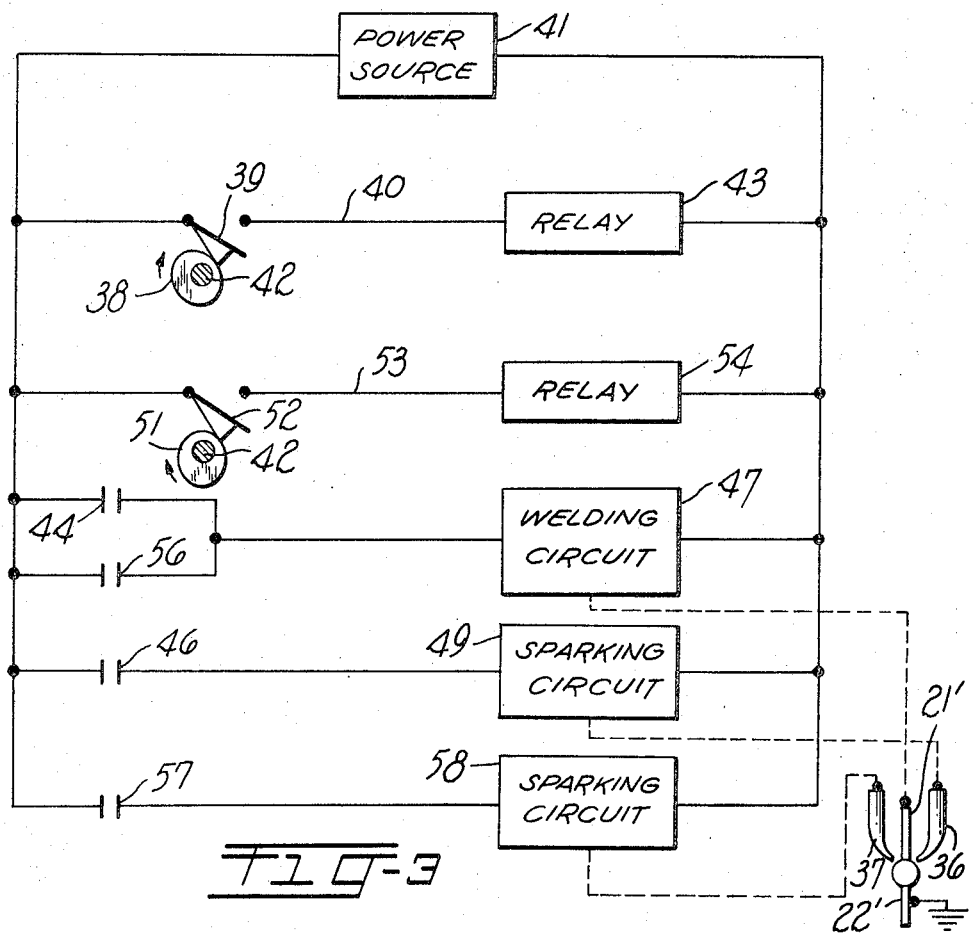

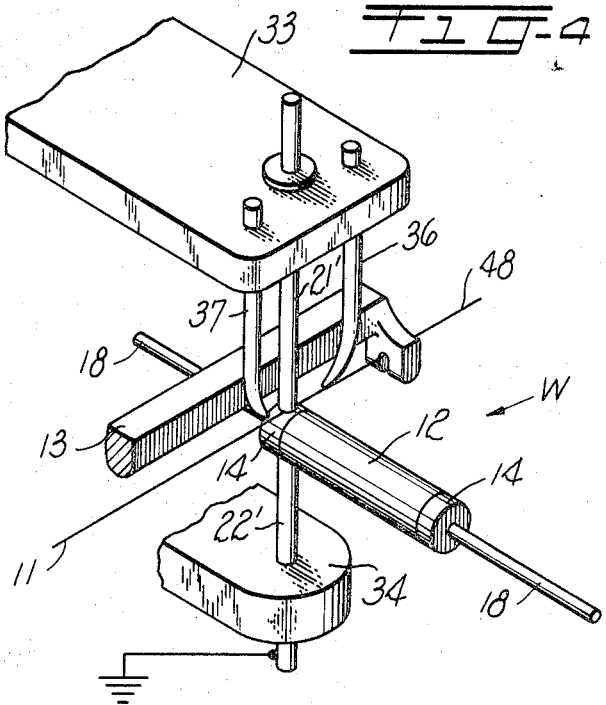
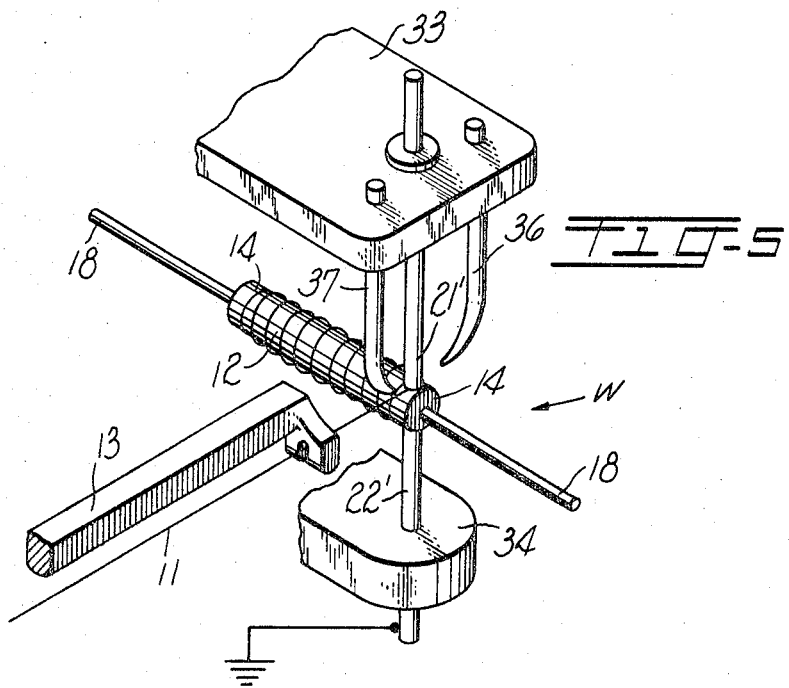

3,553,417

WIRE BONDING AND SERVERING APPARATUS

BACKGROUND OF THE INVENTION

This invention relates to apparatus for bonding a wire to an article and, more particularly, to apparatus for bonding a wire to an article and then severing the wire adjacent the bond.

In apparatus for bonding a wire to one or more points on successive articles, e.g., by welding, utilizing wire originating from a relatively continuous supply of wire such as a reel, it is necessary that the wire be severed from each article after welding, so that additional sections of the wire may be welded to succeeding a articles. The wire most advantageously is severed adjacent the weld to avoid the presence of any excess or "tail" portion of the wire projecting from the article. If the article is an electrical component, the presence of such projecting portion might result in a short circuiting or undesirable grounding of the component.

The use of a pair of relatively movable knife edges to sever the wire adjacent the bond or weld may not be feasible due to spacial limitations in the vicinity of the weld area on the article and in a welding zone of the apparatus. An alternative mechanism for severing the wire is suggested in U.S. Pat. No. 3,303,315, concerning Coil Winding Apparatus, issued Feb. 7, 1967 to N. F. Smith and E. T. Stocker. Immediately after the welding of a wire to an end cap or washer on a component, the mechanism disclosed in U.S. Pat. No. 3,303,315 acts to pull on the wire to break off the wire at the weld while the wire is still in a hot plastic state due to the heat generated during welding. This mechanism requires precise timing of the pulling action in order to break the wire while it is at a high temperature in the vicinity of the weld.

SUMMARY OF THE INVENTION

An object of the invention resides in new and improved apparatus for bonding and severing a wire.

Apparatus constructed in accordance with the principles of the invention is quite compact, and yet will function reliably to sever a wire, closely adjacent to the point at which the wire is bonded to an article, without any critical timing requirement being involved in the operation of the apparatus.

Bonding and severing apparatus constructed in accordance with the invention includes a pair of welding electrodes for welding a wire to an article, plus at least one additional electrode spaced from the wire adjacent a point of weld of the wire to the article. Upon the occurrence of the weld and with the wire grounded, a high intensity spark is established across the gap between the additional electrode and the wire. The arc established is of sufficient intensity to melt or vaporize the portion of the wire adjacent the weld so as to sever the wire from the article.

Apparatus constructed in accordance with the invention may also include a second additional electrode for establishing a second spark adjacent a second weld between the wire and the article. The second additional electrode preferably acts to sever the wire at a different side of the second weld from the side of the first weld on which the first additional electrode is operable.

BRIEF DESCRIPTION OF THE DRAWING

FIGS. 1 and 2 of the drawing are both representative of a prior art mechanism for bonding a wire to an article and then severing the wire adjacent the bond, these FIGS. being reproductions of FIGS. 11 and 12, respectively, of U.S. Pat. No. 3,303,315, concerning Coil Winding Apparatus, issued Feb. 7, 1967 to N. F. Smith and E. T. Stocker, with these FIGS. constituting an isometric view and a front elevational view, respectively, of portions of the prior art apparatus;

FIG. 3 is a diagram of a control circuit which may be used in apparatus of the type shown in FIGS. 1 and 2, when modified in accordance with the principles of the invention to incorporate the novel structure shown in FIGS. 4 and 5; and FIGS. 4 and 5 are isometric views of successive stages in the operation of a portion of bonding and severing apparatus constructed in accordance with the principles of the invention.

DETAILED DESCRIPTION

A Prior Art Coil Winding Apparatus

Figure 1:
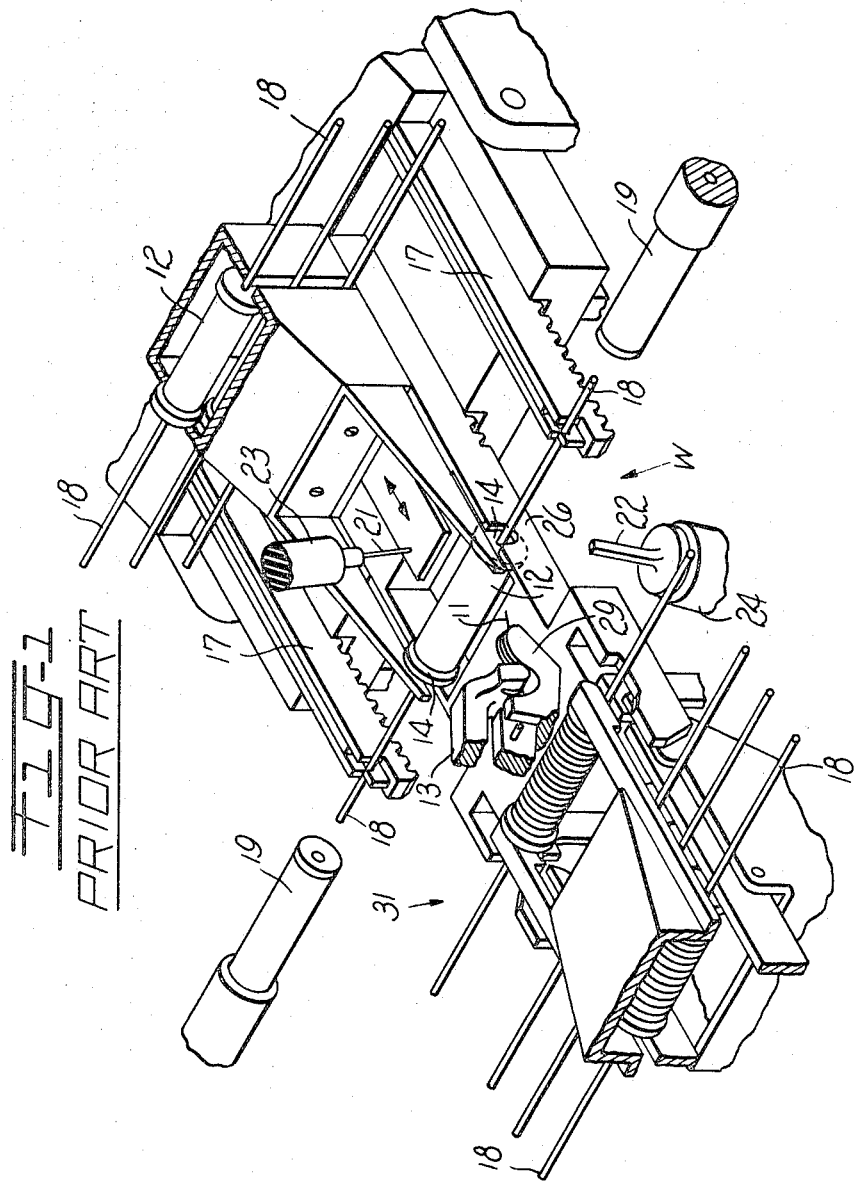

FIGS. 1 and 2 of the drawing illustrate portions of a coil winding apparatus disclosed and described in U.S. Pat. No. 3,303,315, issued Feb. 7, 1967 to N. F. Smith and E. T. Stocker. An embodiment constructed in accordance with the principles of the present invention is usable in a setting provided by the prior art apparatus of U.S. Pat. No. 3,303,315 and will be described with reference to such patent, which may be referred to for a more complete description of the prior art device. It is to be understood, however, that the principles of the invention apply equally well to numerous other types of apparatus, e.g., apparatus for bonding wires to one or more points on various electrical components, such as transistors, by any bonding operation, such as thermocompression bonding or ultrasonic bonding.

FIGS. 1 and 2 show part of an apparatus for producing an article by winding an insulated wire 11 about a coil form 12. The wire 11 extends from a relatively continuous supply of wire, e.g., wire initially wound about a supply reel (not shown), and is gripped by a feeder arm 13. The feeder arm 13 is advanced to extend the wire 11 across an end cap 14 on a coil form positioned in a welding and winding station W, as shown in the central, solid line portion of FIG. 2. An insulation stripping device 16 operates to remove insulation from selected sections of the wire 11 as the sections are advanced toward the welding and winding station W.

Coil forms are advanced successively by a pair of jaw members 17, 17, which grip a pair of leads 18, 18 extending axially outwardly from the end caps 14, 14 of the coil forms. The jaw members position the leads 18, 18 of each successively advanced coil form within the welding and winding station W between a pair of axially movable chucks 19, 19. Axial movement of the chucks 19, 19 will grip a coil form 12 therebetween and transfer the coil form generally to the right from the position shown in FIG. 1. The coil form will be positioned in the station W such that the end cap 14 on the left end of the coil form is in the same vertical plane as an upper welding electrode 21 and a lower welding electrode 22. A pair of carriers 23 and 24 have mounted thereon, respectively, the upper welding electrode 21 and the lower welding electrode 22 and are movable toward each other and into the welding and winding station W. The lower welding electrode 22, which is connected to ground, is brought into contact with a bottom surface of a first end cap 14, i.e., the end cap at the left end of the coil form 12, by such movement. At the same time, the upper welding electrode 21 is moved so as to bear down on a section of the wire 11 overlying the top of the first end cap 14 to hold the wire against the end cap. The section of the wire 11 located between the upper welding electrode and the first end cap has previously been stripped of insulation by the stripping device 16. In order that the described operative arrangement of the chucks 19, 19 and the welding electrodes 21 and 22 might be assumed, the jaw members 17, 17 and a support member 26 have, meanwhile, been pivoted downwardly away from the welding and winding station W.

A welding current is now applied through the upper electrode 21, the stripped section of the wire 11, the first end cap 14 engaged by the stripped section of the wire and the grounded lower electrode 22. Thus, the wire 11 is welded to the first end cap 14. While the wire is still in a hot plastic state in the vicinity of the weld, i.e., immediately upon occurence of the weld, it is pulled forward by the feeder arm 13, as shown in phantom lines at the right in FIG. 2. This movement of the feeder arm severs the wire from the end cap. A clamping pin 27 on the feeder arm 13 is then withdrawn from contact with the severed portion of the wire and an air stream from a nozzle 28 blows the severed wire end from the feeder arm.

The coil form is now rotated about its horizontal central axis by the chucks 19, 19 and is simultaneously moved generally toward the left in FIG. 1. The insulated wire 11 is, therefore, wound about the coil form 12 into a helical coil. The winding continues until another insulation-free section of the wire overlies a second end cap 14, i.e., the end cap at the right end of the coil form, whereupon rotation of the chucks 19, 19 ceases. The feeder arm 13 has, meanwhile, been moved to the position shown in phantom lines at the left side of FIG. 2, where it is located adjacent a wire guide 29.

The clamping pin 27 on the feeder arm 13 is now operated to grip the wire 11, while the carriers 23 and 24 again move their respective welding electrodes 21 and 22 into a welding position with the second end cap 14 and the overlying section of wire 11 located between the welding electrodes. Welding current is again applied, whereupon the feeder arm 13 is immediately moved to the left in FIG. 2. This movement of the feeder arm severs the wire adjacent a weld between the wire and the second end cap 14 while the wire is still in a hot plastic state in the vicinity of the weld. Finally, the finished wound article, constituting a wire wound resistor, is tested in a testing station 31. Numerous articles are manufactured successively by repeated cycles of operation of the device.

A New and Improved Wire Severing Mechanism

By way of reiteration, the above description relates to a prior art device wherein apparatus constructed in accordance with the principles of the present invention may be utilized. More specifically, a new and improved mechanism for severing a wire adjacent a bond or weld, which mechanism is described hereinafter, constitutes a principal part of the present invention.

As may be seen in FIGS. 4 and 5 of the drawing, upper and lower carriers 33 and 34 are used in apparatus such as that of FIGS. 1 and 2 in place of the carriers 23 and 24, respectively. The upper carrier 33 supports an upper welding electrode 21' and, at either side of the upper welding electrode, a pair of arc-establishing or sparking electrodes 36 and 37. The lower carrier 34 supports a lower welding electrode 22'. The carriers 33 and 34 are movable into and out of the welding and winding station W, in similar manner to the carriers 23 and 24, for moving the welding electrodes 21' and 22' into a welding position. It may be noted that holding members, such as the chucks 19, 19 which would act to grip the coil form 12 therebetween, are not shown in FIGS. 4 and 5 in order that the welding and severing mechanism may be depicted more clearly.

FIG. 4 illustrates the apparatus in an operating condition corresponding to that shown in the central, solid line portion of FIG. 2 for the prior art apparatus. The welding electrodes have just been brought into the welding position. Thus, the welding electrodes 21' and 22' are in contact, respectively, with an insulation-free section of the wire 11 engaging a first end cap 14 at the left end of a coil form 12, and with a bottom portion of the first end cap. The welding electrodes hold the wire to the end cap during the welding operation which next occurs.

Turning now to FIG. 3, illustrating a control circuit for operating the apparatus constructed in accordance with the invention, a cam 38 is rotatable to close a normally open switch 39 in a line 40 coupled across a power source 41. The cam 38 is mounted on a main cm shaft 42 of the coil winding apparatus and is rotated to close the switch 39 when the welding electrodes 21' and 22' are in the welding position, described above and shown in FIG. 4, for welding the wire 11 to the first end cap 14. The closing of the switch 39 energizes a relay 43, resulting in the closing of normally open contacts 44 and 46 of the relay 43.

The closing of contact 44 couples a welding circuit 47 across the power source 41. Welding current, thus, is applied from the upper welding electrode 21', through the insulation-free section of wire 11 pressed by the upper welding electrode into contact with a point on the first end cap 14, through the first end cap and to the grounded lower welding electrode 22'. The wire 11 is, therefore, welded to the first end cap 14 with a leading end portion 48 (FIG. 4) of the wire 11, most distant from the relatively continuous supply of wire wound about the supply reel (not shown), extending across the first end cap and held by the feeder arm 13.

The closing of contact 46, upon energization of the relay 43, activates a first sparking circuit 49. The sparking circuit 49 may include its own DC source, or may utilize a suitable transformer and the power source 41. The first sparking circuit 49 includes the sparking electrode 36, which constitutes a first arc establishing or sparking electrode. As may be seen in FIG. 4, the first sparking electrode 36 is located to a first side of the upper welding electrode 21' adjacent to but spaced from the leading end portion 48 of the wire 11 and close to the point of weld between the wire and the first end cap 14. The other or second sparking electrode 37 occupies a corresponding position at a second side of the first welding electrode 21', i.e., adjacent to but spaced from the wire 11 and close to the point of weld between the wire and the first end cap 14, located nearer to the supply of wire than the point of weld.

The closing of contact 46 causes a high intensity spark to arc across the gap between the first sparking electrode 36 and the leading end portion 48 of the wire 11. The arc established across this gap is of sufficient energy to vaporize or melt the wire all along that portion of the wire which extends from the point of weld at the first end cap 14 to the point of least gap between the first sparking electrode 36 and the wire 11. Thus, the remainder of the leading end portion 48 of the wire is severed off from the first end cap 14 and may be released from the feeder arm 13.

Continued rotation of the cam 38, meanwhile, causes the switch 39 to reopen. The carriers 33 and 34 are withdrawn from the welding and winding station W. Winding of the insulated wire 11 about the coil form 12 may now commence.

Since the wire 11 is first held against the first end cap by the upper welding electrode 21' and then welded to the first end cap, and since the wire need not be at any given temperature prior to the establishing of the arc for severing the wire, there is no criticality in the relative timing between the application of welding current and the establishing of the arc. Preferably, however, the arc is established closely following the application of welding current which joins the wire to the first end cap.

Turning now to FIG. 5, the apparatus is shown with the winding operation completed and a second insulation-free section of the wire 11 overlying a point on the second end cap 14 of the coil form 12. The upper end lower carriers 33 and 34 have again been advanced into the welding position, the second end cap 14 and the second section of the wire 11 now occupying this welding position by virtue of axial displacement of the coil form 12 during winding. A cam 51 (FIG. 3) on the main cam shaft 42 now closes a normally open switch 52 in a line 53 coupled across the power source 41. The closing of the switch 52 energizes a relay 54, resulting the closing of normally open contacts 56 and 57 of the relay 54.

The closing of the contact 56 again couples the welding circuit 47 across the power source 41. Welding current is now applied from the upper welding electrode 21', through the second insulation-free section of the wire 11 pressed by the upper welding electrode into contact with a point on the second end cap 14, through the second end cap 14 and to the grounded lower electrode 22'. Thus, the wire 11 is welded to the second end cap 14 with a trailing end portion of the wire extending between the weld and the relatively continuous supply of wire wound about the supply reel (not shown).

The closing of contact 57, upon energization of the relay 54, activates a second sparking circuit 58. The sparking circuit 58 may include its own DC source, or may utilize a suitable transformer and the power source 41. The second sparking circuit 58 includes the second sparking electrode 37. Thus, a high energy spark jumps the gap between the second sparking electrode and the closest point thereto on the wire 11, so as to sever off the trailing end portion of the wire 11. The severing occurs through a vaporizing or melting away of the short portion of the wire which extends from the point of weld between the wire 11 and the second end cap 14 to the closest point on the wire 11 to the second sparking electrode 37, in similar manner to the action of the first sparking electrode in severing off the leading end portion 48 of the wire from the first end cap 14. Again, the timing of the arc established between the second sparking electrode and the trailing portion of the wire 11 is not critical.

The switch 51 reopens with continued rotation of the cam 51, while the carriers 33 and 34 again remove the four electrodes 21', 22', 36, 37 from the welding and winding station W. The finished wound article, having a minimum length of excess wire portions or "tails" extending therefrom, may now be moved into the testing mechanism 31 (FIG. 1), while a succeeding coil form 12 may be advanced into the welding and winding station W for continued operation of the coil winding apparatus.

It should be clear that appropriate arcing distances and spark intensities will vary for different wire diameters and wire materials. Simple and routine experimentation will afford a proper selection of values for each intended use. By way of example only, it has been found that an application of 150 watts of energy across an arcing distance of approximately 0.094 inches will act to sever copper wire having a diameter of 0.031 inches in a fraction of a second. Other arcing distance-spark intensity relationships may also be suitable for severing wire of this general type.

It is to be understood that the above-described apparatus is simply illustrative of one embodiment of the invention. Other embodiments might be utilized in any number of different settings, employing one or more electrodes movable in any known manner into an operative zone for severing a wire or wires at one or more points. Many such modifications may be made without departing from the invention.

We claim:

1. In an apparatus for welding a wire onto an article:
    means for advancing the wire onto the article;
    a movable mounted welding device including a central electrode and two outer electrodes all extending in the same general direction;
    means rendered effective upon an advance of the wire onto the article for moving said welding device to abut the central electrode against the wire to force the wire against said article;
    first means for energizing the central electrode to bond the wire to the article;
    second means rendered effective following an abutting of the wire by the central electrode for selectively energizing one or the other of the outer electrodes to establish an arc between the energized outer electrode and the wire to sever a portion of the wire between the central electrode and the energized outer electrode; and
    means, including a grounded electrode engaging the article during operation of both said first and said second energizing means, for grounding said article to establish a fixed welding current path and an arcing path to be traversed from the central electrode and the energized outer electrode, respectively.

2. In apparatus for welding to first and second spaced points on a weldable article a wire originating from a continuous supply of wire;
    means for supporting the article;
    means for engaging with said first point on the article a first section of the wire which is spaced from a leading end of the wire;
    means for contacting a second section of the wire, located between said first section of the wire and said continuous supply, with said second point on the supported article;
    means including first and second welding electrodes for welding said first section of the wire to said engaged first point on the supported article and said second section of the wire to said contacted second point on the article, said welding means locating the second welding electrode coupled electrically with said first point on the article during welding of said first section of the wire to said first point, said welding means further locating the second welding electrode coupled electrically with said second point on the article during the welding of said second section of the wire to said second point;
    means including a first arc establishing electrode positioned at a leading side of the first welding electrode remote from said second point during the welding of said first section of the wire to said first point and located spaced from but adjacent to the wire for establishing an electric arc with the wire adjacent the first section of the wire at said leading side of the first welding electrode to sever off said leading end of the wire; and
    means including a second arc established electrode positioned at a trailing side of the first welding electrode remote from said first point during the welding of said second section of the wire to said second point and located spaced from but adjacent to the wire for establishing a second electric arc with the wire adjacent the contacted second section of the wire to said trailing side of the first welding electrode to sever off said second section of the wire from said continuous supply.

3. In apparatus for welding a wire to spaced first and second points on each of a succession of weldable articles:
    means intermittently activated for advancing a succession of the articles into a welding station;
    a supply of continuous strand of wire of a length sufficient for welding to a multiplicity of successively advanced articles;
    means intermittently activated upon each successive article being advanced into said welding station for advancing said strand from said supply toward and across said first point on the advanced article to engage successive first sections of the strand of wire with said first point on successively advanced articles;
    a first carrier mounting thereon a first welding electrode and first and second sparking electrodes;
    a second carrier mounting thereon a second welding electrode;
    means intermittently activated with each successive first section of the wire engaging said first point on each successive article for moving said first carrier from an initial position thereof and toward said first section of wire to contact said first welding electrode with said first section of wire, said first sparking electrode being mounted on said first carrier in such position relative to said first welding electrode that said contact occurs with said first sparking electrode located adjacent to but spaced from the wire beyond said first welding electrode from said supply in a direction of advance of the strand of wire;
    means intermittently activated after movements of said first carrier toward each successive first section of the wire for removing said first electrode from contact with said first section of the wire;
    means intermittently activated upon each such removal of said first electrode for engaging each successive second portion of the wire with said second point of each successive article;
    means intermittently activated with each successive second section of the wire engaging said second point on each successive article for moving said first carrier toward said second section of wire to contact said first welding electrode with said second section of wire, said second sparking electrode being mounted on said first carrier in such position relative to said carrier that said contact occurs with said second sparking electrode located adjacent to but spaced from the wire trailing said first welding electrode in said direction of advance of the strand of wire;
    means intermittently activated after movements of said first carrier toward each successive second section of the wire for removing said first electrode from contact with said second section of the wire and returning said first carrier to said initial position thereof;

means movable with movements of said first welding electrode to contact said wire for simultaneously moving said second carrier to contact said second welding electrode with each successive article adjacent the point of contact between said first welding electrode and the wire;

means rendered effective when said first and second welding electrodes contact each successive first or second section of the wire and each successive article, respectively, for applying a welding current through said first electrode, the contacted section of the wire, the article, and said second electrode to weld to the article the contacted section of the wire engaging the article;

means rendered effective upon the welding of each successive first section of the wire to the first point on each successive article for establishing an electric arc between said first sparking electrode and the wire to sever off a leading portion of the wire;

means rendered effective upon the welding of each successive second section of the wire to the second point on each successive article for establishing an electric arc between said second sparking electrode and the wire to sever off a trailing portion of the wire; and means intermittently activated after the severing off of each trailing portion of the wire for removing each successive article from said welding station.

4. In apparatus for bonding a conductive wire to first and second spaced points on an article, the apparatus including means for contacting first and second sections of the wire respectively with said first and second points on the article and means moved between said first and second points on the article for bonding said first and second sections of the wire to said respective first and second points on the article, a mechanism for severing the bonded wire adjacent to said first and second points on the article, which mechanism comprises;

electrode means including first and second are establishing electrodes for establishing a first wire-severing arc in a first arc-establishing location adjacent to but spaced from said first point on the article and a second wire-severing arc in a second arc-establishing location adjacent to but spaced from said second point on the article, respectively;

means effective during bonding of said first section of wire to said first point on the article for supporting said first arc-establishing electrode in said first arc-establishing location and effective during bonding of said second section of wire to said second point on the article for supporting said second arc-establishing electrode in said second arc-establishing location;

means rendered effective upon said bonding means bonding said first section of the wire to said first point on the article with said first arc-establishing electrode positioned in said first arc-establishing location for energizing said first arc-establishing electrode so as to establish a first high energy electric arc between said first arc-establishing electrode and said first section of wire to sever the wire adjacent to said first point on the article; and means rendered effective upon said bonding means bonding said second section of the wire to said second pint point on the article with said second arc-establishing electrode positioned in said second arc-establishing location for energizing said second arc-establishing electrode so as to establish a second high energy electric arc between said second arc-establishing electrode and said second section of wire to sever the wire adjacent to said second point on the article.

5. In an apparatus for bonding a wire onto an article and then severing a section from the wire:

means for positioning the wire on the article with a section of the wire extending from the article;

a first electrode for bonding the wire to the article;

a second electrode for establishing an arc between the second electrode and the wire to sever the extending section;

means for supporting the first electrode in engagement with the wire on the article and for supporting the second electrode with an end thereof spaced from the extending section of wire and the point at which the first electrode engages the wire; and means for sequentially applying electrical energy to the first electrode to bond the wire to the article and then for applying electrical energy to the second electrode to establish an arc between the second electrode and the extending section of the wire to sever the wire at a point spaced from the point at which the first electrode bonds the wire to the article.

6. In apparatus utilizing a welding electrode to weld a wire to a plurality of weld locations, a mechanism for severing the wire at a selected side of each weld, which mechanism comprises:

first arc-establishing electrode means mounted at a first side of the welding electrode and responsive to energization for discharging a wire-severing arc to the wire at said first side of the welding electrode;

second arc-establishing electrode means mounted at a second side of the welding electrode and responsive to energization for discharging a wire-severing arc to the wire at said second side of the welding electrode;

means rendered effective upon the welding electrode welding the wire to each weld location for selecting one of said two arc-establishing electrode means to be energized; and means rendered effective upon the welding electrode welding the wire to each location for energizing the selected arc-establishing electrode means to sever the wire at the selected side of the weld.

7. In apparatus as set forth in claim 6, said weld locations constituting terminal elements provided at spaced positions on an electrical component;

a source of said wire;

means for extending the wire from the source into contact with a first of said weld locations on the electrical component;

means for moving the electrical component relative to the wire to contact the wire with a second of said weld location;

said first arc-establishing means being mounted at a side of the welding electrode away from the source of wire;

said second arc-establishing means being mounted at a side of the welding electrode toward the source of wire;

said selecting means selecting said first arc-establishing electrode means to be energized upon welding of the wire to said first weld location; and said selecting means selecting said second arc-establishing electrode means to be energized upon welding of the wire to said second weld location.